United States Patent
Park

(10) Patent No.: US 8,644,213 B2
(45) Date of Patent: Feb. 4, 2014

(54) MOBILE DATA COMMUNICATION METHOD AND SYSTEM USING IMPROVED MEDIUM ACCESS CONTROL PROTOCOL

(75) Inventor: Deukhyoung Park, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 815 days.

(21) Appl. No.: 12/343,670

(22) Filed: Dec. 24, 2008

(65) Prior Publication Data
US 2009/0168744 A1 Jul. 2, 2009

(30) Foreign Application Priority Data
Dec. 26, 2007 (KR) .......................... 10-2007-0137542

(51) Int. Cl.
*H04B 7/212* (2006.01)
(52) U.S. Cl.
USPC ........... 370/322; 370/326; 370/328; 370/337; 370/347; 370/442; 370/447; 370/461; 370/462
(58) Field of Classification Search
USPC .................. 370/331, 321, 322, 337, 347, 442
See application file for complete search history.

(56) References Cited

U.S. PATENT DOCUMENTS

| 7,110,380 B2 * | 9/2006 | Shvodian ...................... 370/336 |
| 7,366,202 B2 * | 4/2008 | Scherzer et al. ............... 370/480 |
| 7,573,865 B2 * | 8/2009 | Shvodian ...................... 370/350 |
| 2007/0230338 A1 * | 10/2007 | Shao et al. ..................... 370/230 |
| 2007/0280237 A1 * | 12/2007 | Shin et al. ..................... 370/390 |

\* cited by examiner

*Primary Examiner* — Alvin A Zhu
(74) *Attorney, Agent, or Firm* — Cha & Reiter, LLC

(57) ABSTRACT

A data communication method and system for a mobile communication network includes an improved medium access control mechanism for improving QoS and power efficiency of network components while maintaining channelization effects. A data communication method for a wireless communication network includes a coordinator and at least one network node according to the present invention includes the steps of broadcasting, at the coordinator, a beacon frame for informing the at least one network node of a duration of a superframe; transmitting a Guaranteed Time Slot (GTS) from the coordinator to the at least one network node for allocating timeslots; and transmitting a data frame from the coordinator to the at least one wireless network through the timeslots allocated to the at least one wireless network node.

23 Claims, 7 Drawing Sheets

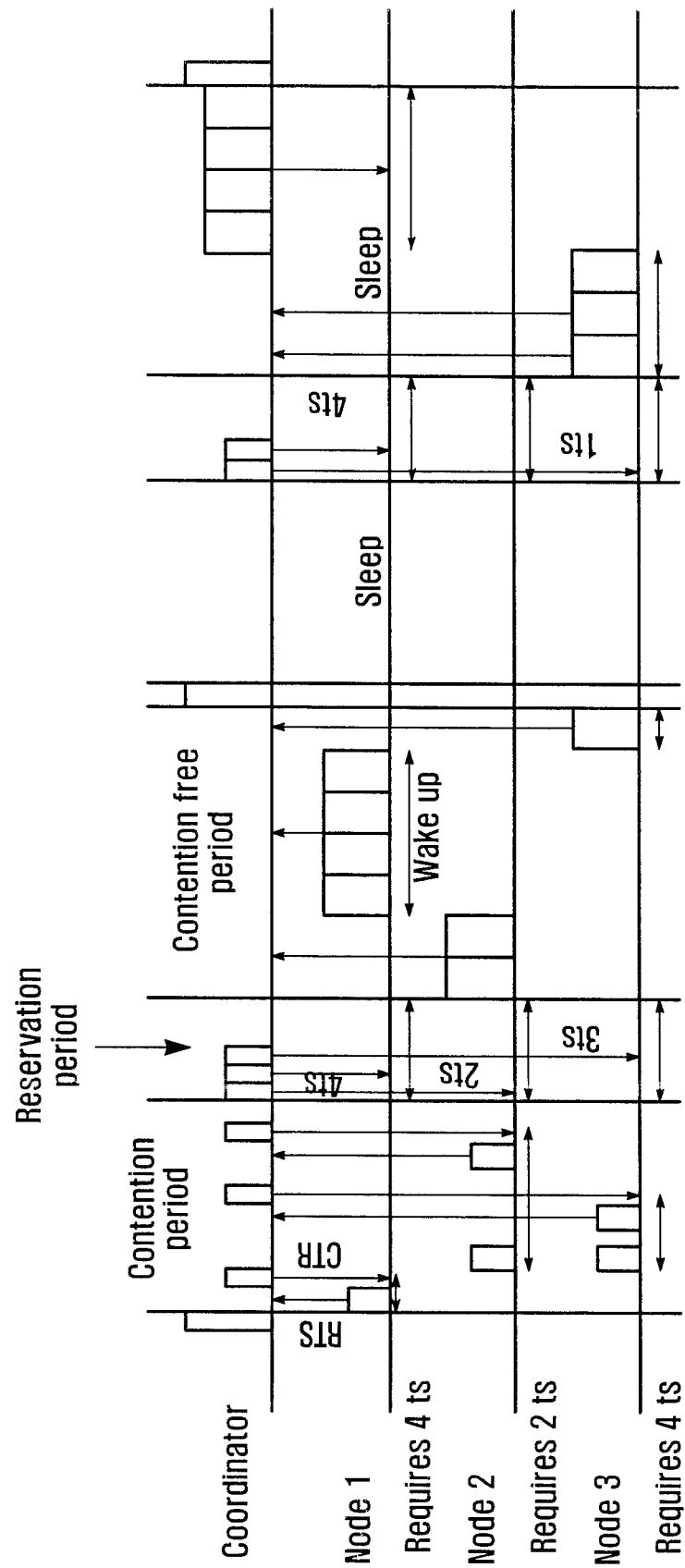

MOBILE DATA COMMUNICATION METHOD AND SYSTEM USING IMPROVED MEDIUM ACCESS CONTROL PROTOCOL

CLAIM OF PRIORITY

This application claims priority under 35 U.S.C. §119 from an application entitled "MOBILE DATA COMMUNICATION METHOD AND SYSTEM USING IMPROVED MEDIUM ACCESS CONTROL PROTOCOL" filed in the Korean Intellectual Property Office on Dec. 26, 2007 and assigned Serial No. 2007-0137542, the contents of which are incorporated herein by reference in its entirety.

BACKGROUND OF THE INVENTION

1. Field of the Invention

The present invention relates to a data communication method and system for a mobile communication network. More particularly, the present invention relates to a mobile communication network using an improved medium access control mechanism that is capable of improving Quality of Service (QoS) and power control efficiency while maintaining advantages of channelization effects.

2. Description of the Related Art

Typically, wireless network environment is characterized by an often noisy and shared signal propagation medium. In order to provide fair scheduling to a plurality of network nodes and guarantee reliable data transmissions, Carrier Sense Multiple Access with Collision Avoidance (CSMA/CA) Medium Access Control (MAC) protocol has been adopted in wireless networks.

Wireless MAC protocols are designed such that a plurality of nodes participate in channel contention, and a node transmission privilege acquired through the contention transmits a frame successfully.

MAC protocols can be classified into either a contention-based or a reservation-based approach.

Typically, contention-based MAC protocols are implemented with the aforementioned CSMA/CA scheme. With its simple structure and channel utilization efficiency, the CSMA/CA-based MAC protocols are widely employed in wireless networks. However, the CSMA/CA-based MAC protocols are difficult to control a Quality of Service (QoS). Since the transmission time of a sender is not predictive of subsequent transmission times, the receiver should always stay in a standby, resulting in low power efficiency.

In contrast, the reservation-based MAC protocols are implemented with a Time Division multiple Access (TDMA) scheme. The TDMA-based MAC protocols allocate timeslots to the network nodes such that the packet delivery times of the networks are predictive. The receiver receives frames through the timeslot allocated to it and enters sleep mode during the other timeslots duration, thereby reducing power consumption and facilitating control of QoS. However, the reservation-based MAC protocol suffers from a low channel utilization efficiency.

Accordingly, there has been a long-felt need for an enhanced wireless MAC protocol and communication that is capable of improving QoS and power control while maintaining the channel utilization efficiency.

SUMMARY OF THE INVENTION

The present invention provides a wireless communication method and system that improves QoS and power control without compromising channel utilization efficiency using an improved MAC protocol.

Also, the present invention provides a wireless communication method and system that for reducing power consumption of network nodes and improving QoS and channel utilization efficiency simultaneously using a hybrid reservation-contention MAC protocol.

In accordance with an exemplary embodiment of the present invention, a data communication method for a wireless communication network including a coordinator and at least one network node includes broadcasting, at the coordinator, a beacon frame for informing said at least one network node of a duration of a superframe; transmitting a Guaranteed Time Slot (GTS) frame from the coordinator to said at least one network node for allocating timeslots; and transmitting a data frame from the coordinator to said at least one wireless network through the timeslots allocated to said at least one wireless network node.

In accordance with another exemplary embodiment of the present invention, a data communication method for a wireless communication network including a coordinator and at least one network node includes broadcasting, at the coordinator, a beacon frame for informing the at least one network node of a duration of a superframe; transmitting a Request To Send (RTS) frame from the at least one network node received the beacon frame to the coordinator for requesting allocation of timeslots; transmitting, at the coordinator, a Confirmation To Request (CTR) in response to the RTS frame; transmitting a Guaranteed Time Slot (GTS) frame from the coordinator to the at least one network node for informing of timeslots reserved for the at least one network node; and transmitting a data frame from the at least one network node to the coordinator through the timeslots reserved for the at least one network node.

BRIEF DESCRIPTION OF THE DRAWINGS

The above and other exemplary objects, features and advantages of the present invention will be more apparent from the following detailed description in conjunction with the accompanying drawings, in which:

FIG. 7 is a diagram illustrating a superframe transmission procedure of a data communication method according to an exemplary embodiment of the present invention.

DETAILED DESCRIPTION

Exemplary embodiments of the present invention are described with reference to the accompanying drawings in detail. The same reference numbers are used throughout the drawings to refer to the same or similar parts. Detailed descriptions of well-known functions and structures incorporated herein may be omitted to avoid obscuring appreciation of the subject matter of the present invention by a person of ordinary skill in the art.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

In the following exemplary description, a hybrid Medium Access Control (MAC) protocol, combining the advantages of the contention-based and reservation-based MAC protocols, and a communication method using the hybrid MAC protocol are proposed. The proposed hybrid MAC protocol is advantageous in channel utilization, power consumption efficiency, and resource scheduling performance.

In the following exemplary description, a wireless network includes a plurality of network nodes and a coordinator for controlling channel allocation to the network nodes. The coordinator acts as a master node and can be incorporated into a base station or a specific node configured to broadcast beacon frames. The coordinator broadcasts the beacon frames periodically so as to delimiting superframe boundaries and providing the network nodes with information on the medium status. The network nodes are of receiving the beacon frames broadcasted by the coordinator.

Figure 1:
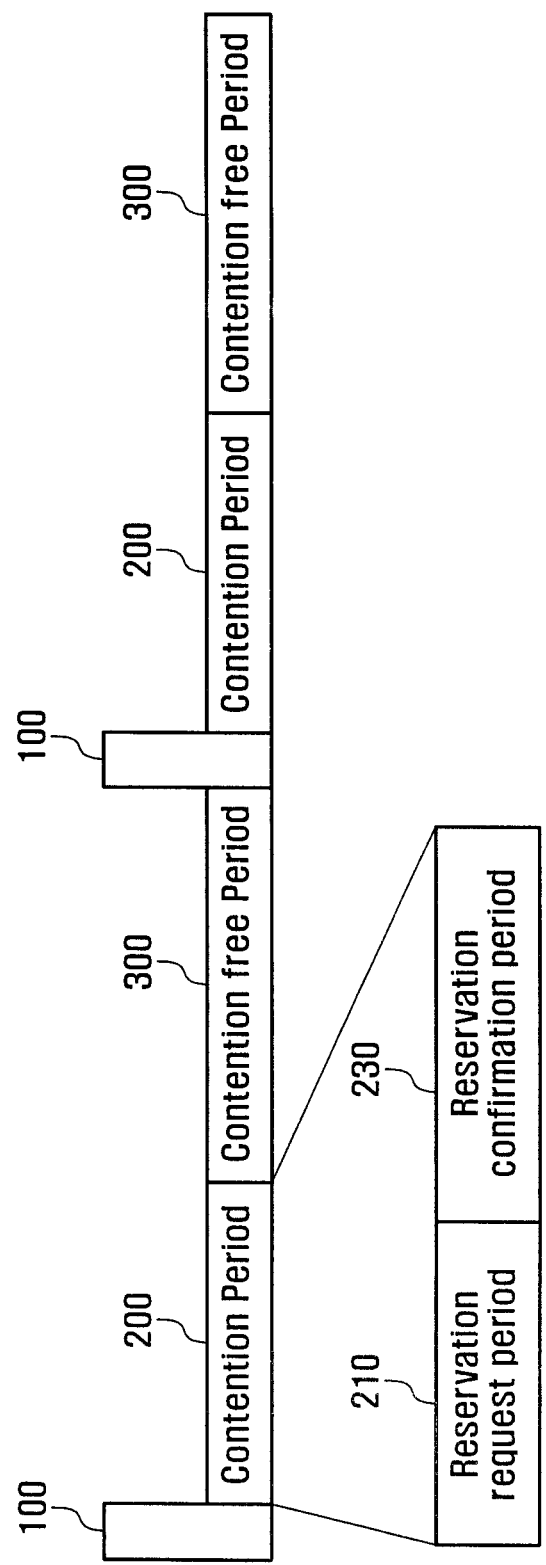
FIG. 1 is a diagram illustrating a superframe structure for use in the wireless data communication system according to an exemplary embodiment of the present invention.

FIG. 1 is a diagram illustrating a superframe structure for use in the wireless data communication system according to an exemplary embodiment of the present invention.

Referring to FIG. 1, a MAC superframe includes a beacon period 100, contention period 200, and a contention free period 300. The contention period 200 includes a reservation request period 210 and a reservation confirmation period 230.

In order to acquire synchronization between the coordinator and the network nodes, synchronization information is required. Accordingly, the coordinator transmits the synchronization information in a part of the beacon period 100. The network node wanting to transmit data, will transmit the data in the contention free period 300 of the superframe.

During the beacon period 100 of the superframe, the network nodes receive a beacon frame transmitted by the coordinator, and the coordinator can control communication with the network node using the beacon frame.

Still referring to FIG. 1, the contention period 200 of the superframe provides a time for exchanging resource request and acknowledgement messages between the network nodes and the coordinator. At this time, the coordinator allocates timeslots to the network nodes using a Guaranteed Time Slot (GTS) frame.

As previously discussed above, the contention period 200 is divided into a reservation request period 210 and a reservation confirmation period 230. During the reservation request period 210, the network nodes request channel allocation for the contention free period 300. During this reservation request period, a Request To Send (RTS) frame is transmitted by a network node requesting/needing to transmit data, and the coordinator transmits a Confirmation To Request (CTR) frame to the network node in response to the RTS frame. The RTS frame includes information on the timeslots required for transmitting data frames.

During the reservation confirmation period 230, the coordinator transmits a channel allocation frame to the network node that requested channel allocation during the reservation request period 210. Accordingly, the network nodes recognize the timeslots allocated to themselves with reference to the GTS frame transmitted by the coordinator. The GTS frame carries information on the timeslots allocated for receiving and transmitting data frames.

Still referring to FIG. 1, the contention free period 300 is of communicating data between the network nodes and the coordinator through the channels allocated to the network nodes. That is, the network nodes and the coordinator exchange data and acknowledgement (ACK) frames during the contention free period 300 according to, for example, the allocated slot assignments. Note that the data frame and ACK frame are signal exchanging between the network nodes and the coordinator through the channels allocated to the network nodes corresponding the contention free period.

In the aforementioned paragraphs the exemplary structure of the superframe shown in FIG. 1 in the present invention has been described.

Herein below is an explanation about the way the data frame is transmitted using the above-structured superframe is described hereinafter. A reference to superframe is described in IEEE 802.15.3/802.15.4 spec.

Figure 2:
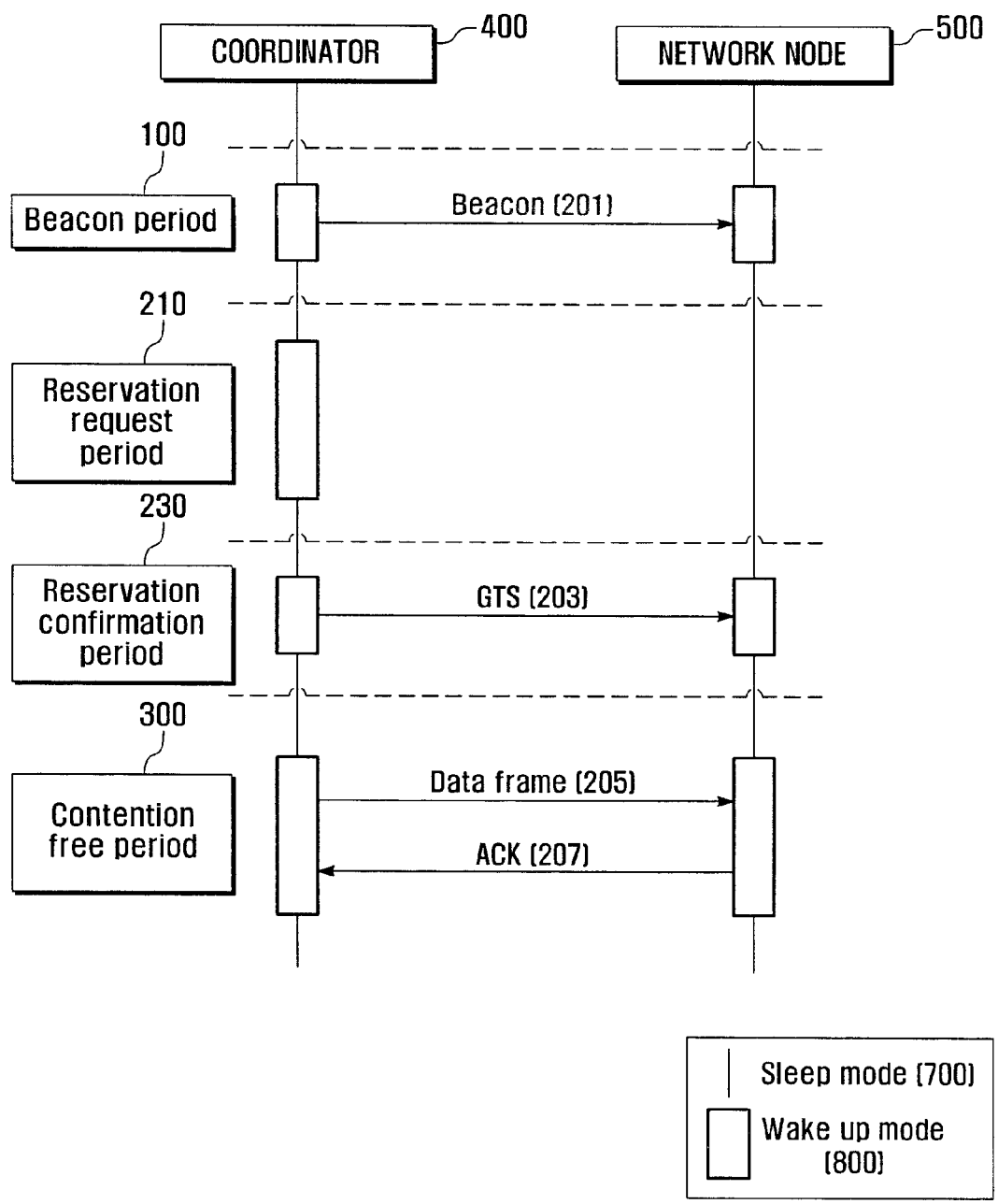
FIG. 2 is a message flow diagram illustrating a data communication method according to an exemplary embodiment of the present invention.

FIG. 2 is a message flow diagram illustrating one example of a data communication method according to an exemplary embodiment of the present invention. FIG. 2 shows a case in which a coordinator 400 transmits a data frame to a network node 500.

Still referring to FIG. 2, reference numeral 700 and 800 indicating the solid lines and rectangular blocks denote the power modes of the network node 500 and the coordinator 400. For example, the solid lines in this example denote sleep modes of the coordinator 400 and network node 500, and the rectangular blocks denote wakeup modes of the coordinator 400 and network node 500.

In accordance with FIG. 2, the coordinator 400 broadcasts a beacon frame and the network node 500 receives the beacon frame during the beacon period 100 (S201). The coordinator 400 can control communication with the network node 500 using the beacon frame. That is, the network node 500 operates with reference to the beacon frame. During the beacon period 100, the coordinator 400 and the network node 500 wake up from the sleep mode such that the coordinator 400 transmits the beacon frame and the network node 500 receives the beacon frame. Both the coordinator 400 and the network node 500 wait for a predetermined time after transmitting and receiving the beacon frame and enter the sleep mode 700.

In the next step, the coordinator 400 recognizes the arrival of the reservation request period 210 and wakes up from the sleep mode 700 and waits for receiving an RTS frame from the network node 500 in the wakeup mode 800. After a predetermined time period elapses, the coordinator 400 then enters the sleep mode 700 again. At this time, the network node 500, which has no data to transmit or receive, stays in the sleep mode 700. The network node 500 recognizes that it has no data to receive, with reference to the beacon frame.

When the reservation confirmation period 230 starts, both the coordinator 400 and the network node 500 wake up from the sleep mode.

During the reservation confirmation period 230, the coordinator 400 allocates timeslots for transmitting a data frame to the network node 500 and notifies the network node 500 of the allocated times using the GTS frame (S203). Accordingly, the network node 500 may be allocated the at least a portion of the contention free channel in the contention free period 300. Here, the GTS frame carries the information on the transmission and/or reception timeslots allocated to the target network node, i.e. the network 500.

The coordinator 400 enters sleep mode after transmitting the GTS frame, and the network node 500 enters sleep mode after receiving the GTS frame. Afterward, the coordinator 400 wakes up in the contention free period 300 and transmits the data frame to the target network node, i.e. the network node 500, using the timeslots reserved for the network node 500 (S205). Also, the network node 500 wakes up from the sleep mode and receives the data frame through the reserved timeslots.

Upon receipt of the data frame, the network node 500 transmits an Acknowledgement (ACK) frame to the coordinator 400 in response to the data frame (S207). If the coordinator 400 fails to receive the ACK frame, the coordinator 400 determines that a transmission error has occurred. In this case, the coordinator 400 assigns a higher transmission priority for the data frame in the next superframe such that the above-described procedure is repeated.

Figure 3:
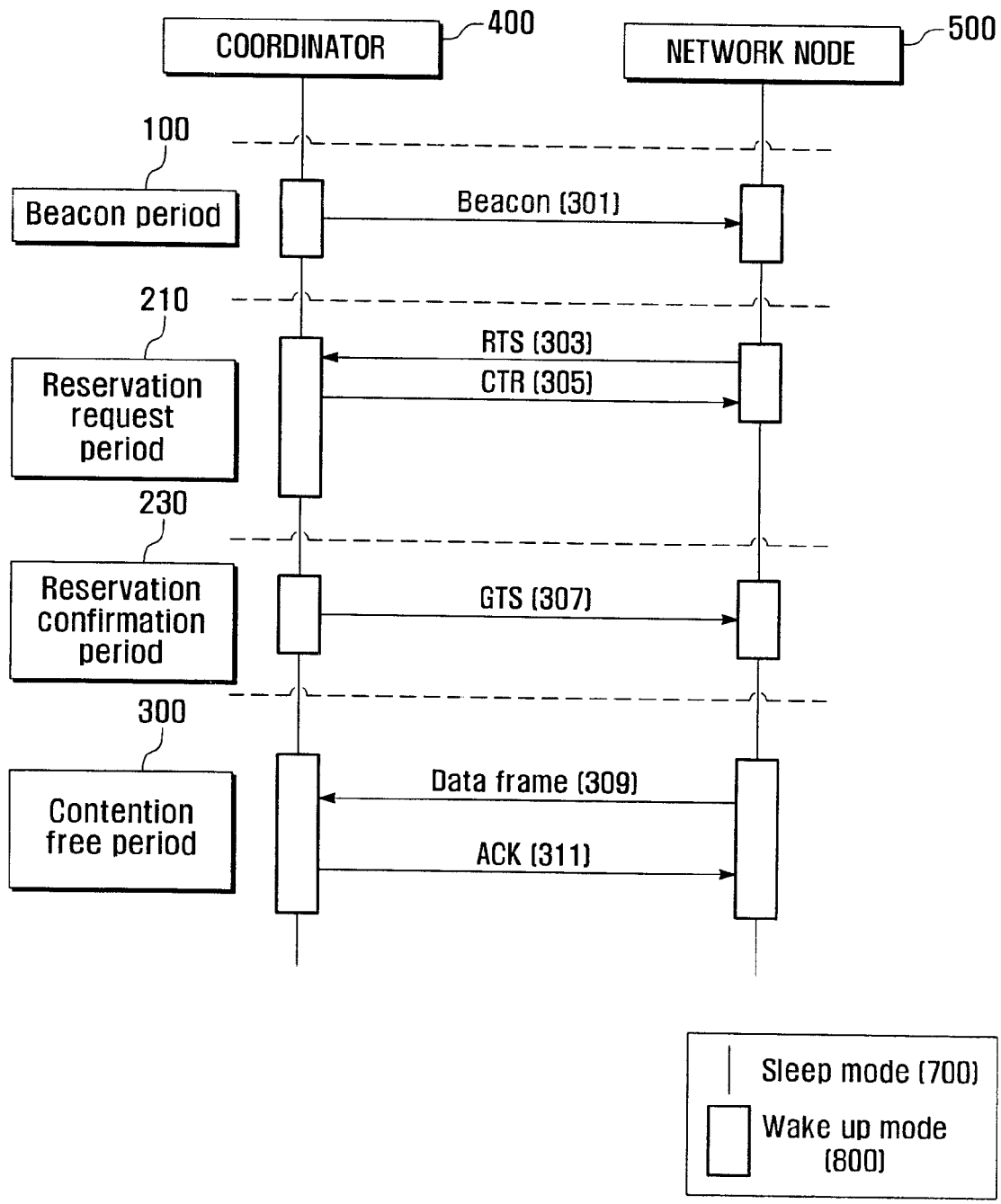
FIG. 3 is a message flow diagram illustrating a data communication method according to another exemplary embodiment of the present invention.

FIG. 3 is a message flow diagram illustrating a data communication method according to another exemplary embodiment of the present invention. FIG. 3 shows a case in which the network node 500 transmits a data frame to the coordinator 400.

In FIG. 3, reference numeral 700 and 800 indicating the solid lines and rectangular blocks that denote the power modes of the network node and the coordinator. More particularly, the solid lines denote sleep modes of the coordinator 400 and network node 500, and the rectangular blocks denote wakeup modes of the coordinator 400 and network node 500.

The coordinator 400 broadcasts a beacon frame so as to inform the network node 500 of the superframe duration (S301). The coordinator 400 can control communication with the network node 500 by using the beacon frame. More particularly, the network node 500 operates with reference to the beacon frame transmitted by the coordinator 400. During the beacon period 100, the coordinator 400 and the network node 500 wake up from the sleep mode and the coordinator 400 transmits the beacon frame and the network node 500 receives the beacon frame. The coordinator 400 and the network node 500 wait for a predetermined time after transmitting and receiving the beacon frame and then enter the sleep mode 700.

Subsequently, the coordinator 400 recognizes start of the reservation request period 210 and wakes up from the sleep mode 700. During the reservation request period 210, the coordinator 400 transmits an RTS frame (S303), and the network node 500 transmits a CTR frame in response to the RTS frame (S305).

In order for the network node 500 to transmit a data frame to the coordinator 400, the network node 500 requests timeslots for transmitting data during the contention free period 300 (S303). The RTS frame may include information on the timeslots required for transmitting the data frame.

At this time, other neighboring nodes may transmit the RTS frames to the coordinator 400 during the reservation request period 210. In a case where a plurality of network nodes transmits the RTS frames simultaneously, collision(s) may occur. This collision problem can be solved by a backoff mechanism of the CSMA/CA mechanism. The backoff mechanism is outside of the present invention, so details of regarding the backoff mechanism are omitted.

Still referring to FIG. 3, during the reservation request period 210, the coordinator 400 transmits a CTR frame in response to the RTS frame transmitted by the network node 500 (S305). All the network nodes having a data frame for transmission transmits RTS frames to the coordinator 400 and recognizes their particular registration with the coordinator 400 upon receiving the CRT frame in response to the RTS frames. Note that the CRT frame is the same frame broadcast to all the nodes regarding transmission information.

Still referring to FIG. 3, upon receipt of the CTR frame, the network node 500 waits for a predetermined time and enters the sleep mode 700 and wakes up from the sleep mode 700 with the start of the reservation confirmation period 230. After transmitting the CTR frame, the coordinator 400 waits for receiving RTS frames transmitted by other neighboring network nodes during a predetermined time, and then enters the sleep mode. Here, the coordinator 400 may stay in the wakeup mode longer than the network node 500, since the coordinator 400 waits for receiving the RTS frames transmitted by other network nodes.

When the reservation confirmation period 230 starts, the coordinator 400 and the network node 500 wake up from the sleep mode 700.

The coordinator 400 transmits the GTS frame to the network node 500 during the reservation request period 230 (S307). The GTS frame carries information on timeslots that have been allocated to the network node 500.

The network node 500 can be allocated the entire, or a portion of the timeslots of the contention free period 300. That is, the coordinator 400 may assign the timeslots in their entirety, meaning that the contention free channels of the contention free period 300 may be allocated to just one target network node. The GTS frame also carries information on whether the timeslots are allocated for an uplink frame or a downlink frame.

The coordinator 400 enters the sleep mode after transmitting the GTS frame, and the network node 500 enters the sleep mode after receiving the GTS frame.

Still referring to FIG. 3, when the contention free period 300 starts, both the coordinator 400 and network node 500 wake up from the sleep mode such that the network node 500 transmits the data frame through the reserved timeslots (S309). If the data frame transmitted by the network node 400 is successfully received, the coordinator 400 transmits an ACK frame to the network node 400 (S311). If the network node does not receive an ACK frame from the coordinator 400, then the network node determines that a transmission error has occurred. In this case, the network node 500 transmits the data frame in the next superframe duration.

Although the network node 500 receives the CTR frame from the coordinator 400, the coordinator 400 may not allocate timeslots to the network node 500 due to network congestion. At this time, the timeslot allocation procedure is performed in the next or subsequent superframe duration.

Now a contention-based data transmission method according to an exemplary embodiment of the present invention will be described hereinafter. However, the presently claimed invention is not limited to the following description. The contention-based data transmission method may be practiced without the specific details or with certain alternative equivalent devices and methods to those described herein.

Figure 4:
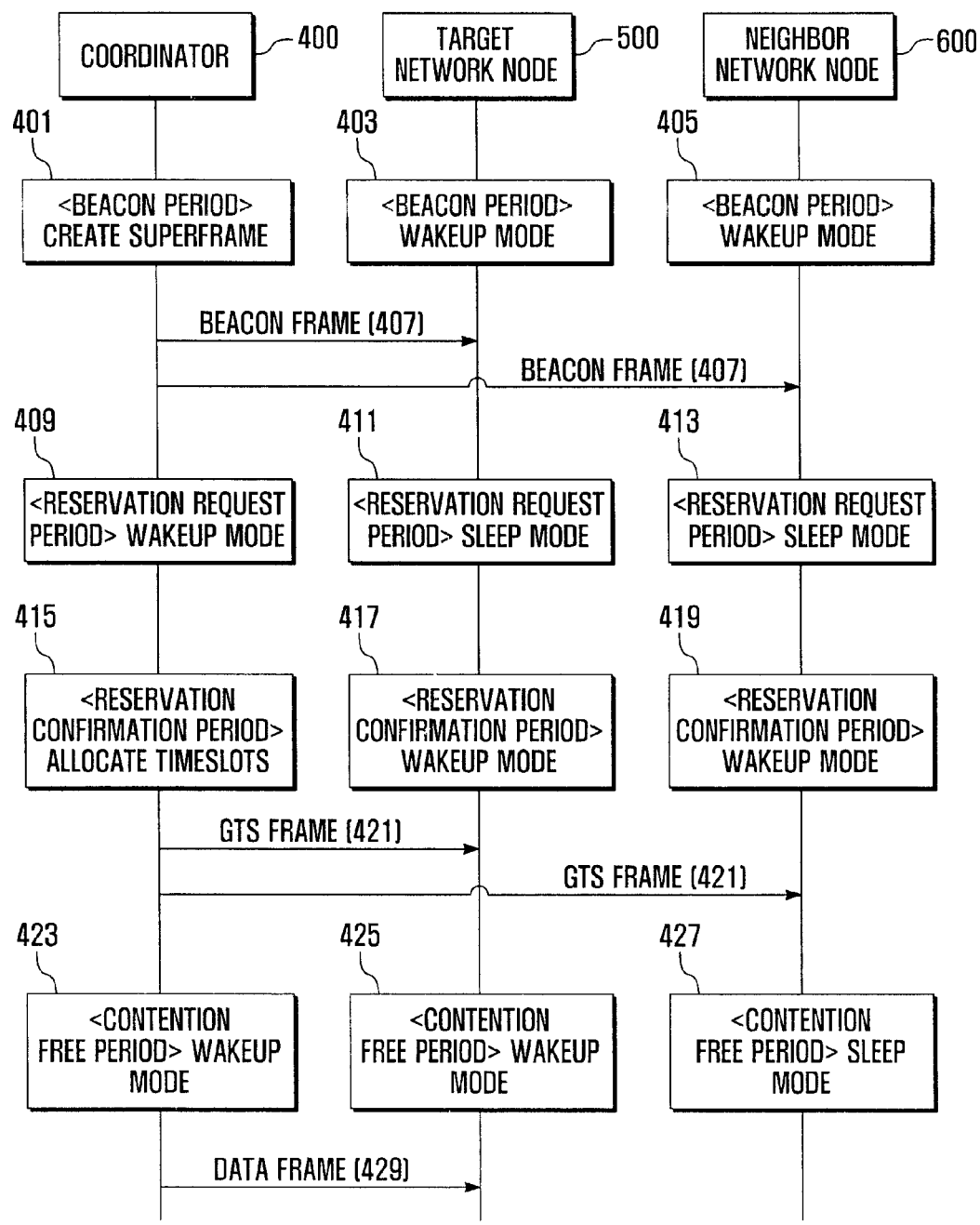
FIG. 4 is a message flow diagram illustrating a data communication method according to another exemplary embodiment of the present invention.

FIG. 4 is a message flow diagram illustrating a data communication method according to another exemplary embodiment of the present invention. In FIG. 4, the coordinator 400 transmits data frames to the network nodes 500 and 600, wherein node 500 in this example is a target network node 500, and node 600 in this example is a neighboring network node 600 of target network node 500.

The coordinator 400 broadcasts a beacon frame periodically, and the network nodes 500 and 600 acquire information on the superframe duration and medium state from the beacon frame. In this exemplary embodiment, the network node 500 is the target network node which receives a data frame through the downlink timeslots allocated by the coordinator 400.

Referring to FIGS. 1 and 4, the coordinator 400 creates a superframe during the beacon period 200 (S401) and broadcasts the beacon frame (S407). At this time, the target network node 500 and the neighbor network node 600 operate during the beacon period in the wakeup mode (S403 and 405) so as to receive the beacon frame. The coordinator 400 may enter the sleep mode after transmitting the beacon frame, and the network nodes 500 and 600 may enter the sleep mode after receiving the beacon frame.

The beacon frame carries information regarding the superframe such that the network nodes 500 and 600 extract information on the superframe information from the beacon frame. The start time of the superframe is determined by the start time of the beacon period, called beacon period start time. The coordinator 400 can control communications with the network nodes 500 and 600 using the beacon frame.

The coordinator 400 enters the sleep mode after transmitting the beacon frame, and the network nodes 500 and 600 enter the sleep mode after receiving the beacon frame.

Next, the coordinator 400 wakes up from the sleep mode upon the start of the reservation request period (S409). In the reservation request period, the coordinator 400 waits for receiving RTS frames transmitted by the network nodes 500 and 600.

Here, when they have no data to transmit, the network nodes 500 and 600 may stay in the sleep mode (S411 and S413). In other words, the network nodes 500 and 600 have the information on their active durations with reference to the beacon frame and stay in the sleep mode before respective starts of their active durations. Of course, another network node may wake up for transmitting the RTS frame while the two network nodes 500 and 600 are in the sleep mode.

Upon arrival of the time slot confirmation mode 230, the coordinator 400 wakes up from the sleep mode and allocates timeslots to the network nodes 500 and 600 (S415) and broadcasts a GTS frame to the network nodes 500 and 600 (S421). Also, each network node (e.g. 500 and 600 in this example) wake up from the sleep mode (S417 and 419) and receive the GTS frame so as to recognize a respective timeslot(s) assigned thereto by the coordinator 400.

Still referring to FIG. 4, the coordinator 400 enters the sleep mode again after transmitting the GTS frame, and the network nodes 500 and 600 enter the sleep mode too after receiving the GTS frame. The GTS frame carries information on the uplink and downlink timeslots of the network nodes 500 and 600 associated with the coordinator 400.

Upon arrival of the contention free period 300, the coordinator 400 and the target network node 500 wake up (S423 and S425) while the neighbor network node 500 stays in the sleep mode (S427). During the contention free period 300, the coordinator 400 transmits a data frame destined to the target network node 500 through the downlink timeslots allocated for the target network node 500 (S429).

Figure 5:
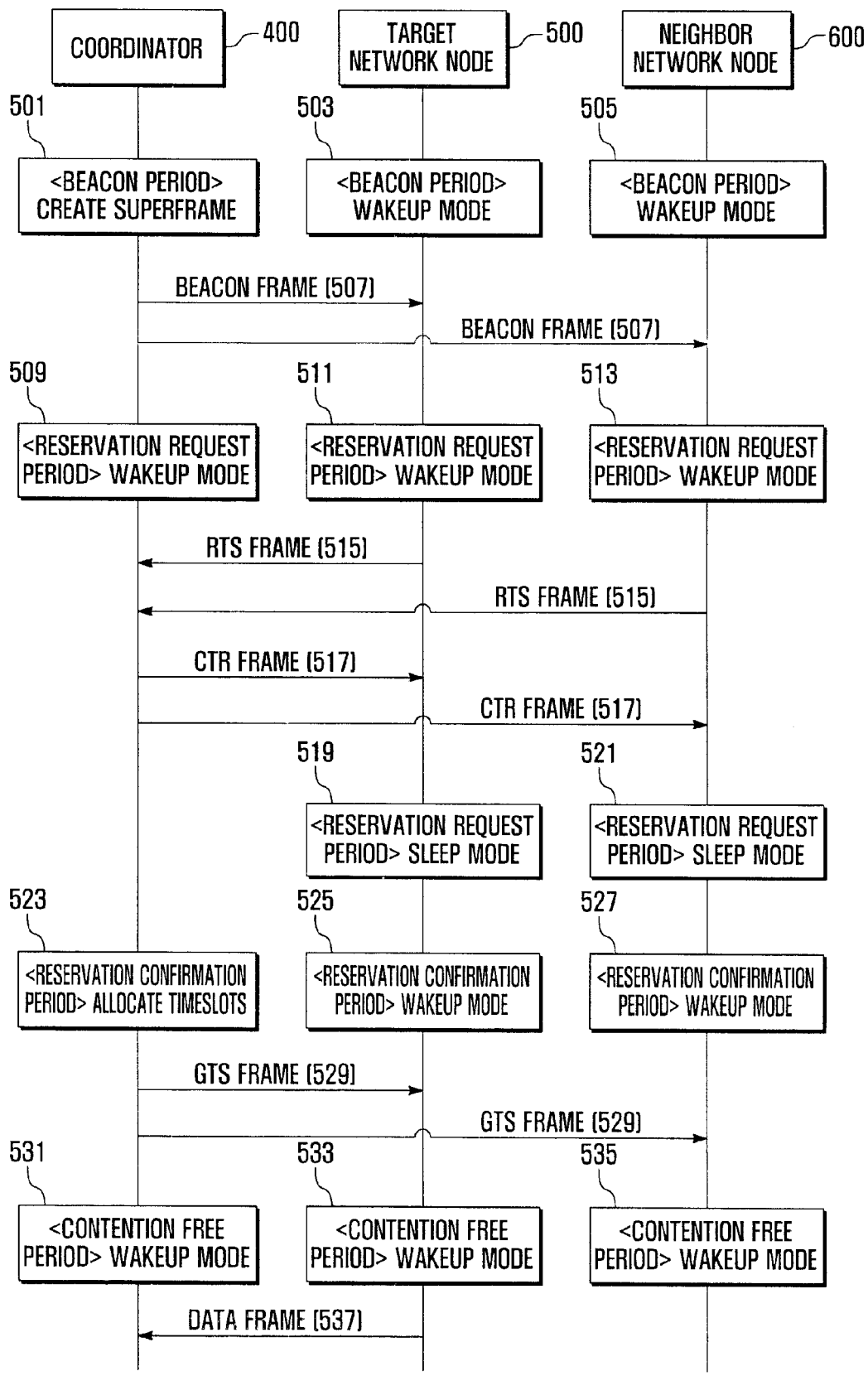
FIG. 5 is a message flow diagram illustrating a data communication method according to another exemplary embodiment of the present invention.

FIG. 5 is a message flow diagram illustrating a data communication method according to another exemplary embodiment of the present invention. In FIG. 5, the target network 500 transmits a data frame to the coordinator 400.

The coordinator 400 broadcasts a beacon frame periodically, and the network nodes 500 and 600 acquire information on the superframe duration and medium state from the beacon frame. In this exemplary embodiment, the network node 500 is the target network node which transmits a data frame through the uplink timeslots allocated by the coordinator 400. Node 600 is the neighboring network node of node 500.

Referring now to FIGS. 1 and 5, the coordinator first creates a superframe during the beacon period 200 (S501) and broadcasts the beacon frame (S507). At this time, the network nodes 500 and 600 are in the wakeup mode (S503 and S505), so as to receive the beacon frame. After broadcasting the beacon frame (S507), the coordinator 400 may enter the sleep mode. Also, the network nodes 500 and 600 enter the sleep mode after receiving the beacon frame.

The beacon frame carries the information regarding the superframe such that the network nodes 500 and 600 extract information about the superframe information from the beacon frame. The start time of the superframe is preferably identical with the start time of the beacon period, called a beacon period start time. The coordinator 400 can control communications with the network nodes 500 and 600 using the beacon frame.

The coordinator 400 enters the sleep mode after transmitting the beacon frame, and the network nodes 500 and 600 also enter the sleep mode after receiving the beacon frame.

Still referring to FIGS. 1 and 5, the coordinator 400 and the network nodes 500 and 600 wake up from the sleep mode upon start of the reservation request period 210 (S509, S511, and S513), and the network nodes 500 and 600 transmit RTS frames to the coordinator 400 for requesting channel allocation (S515). The RTS frames include information on the timeslots requested by the network nodes 500 and 600.

In the reservation request period 210, the coordinator 400 transmits the CRT frames to the network nodes 500 and 600 in response to the respective RTS frame (S517). If the CTR frames are received, the network nodes 500 and 600 acquire information on the reserved channels from the CTR frame.

After receipt of the CRT frames, the network nodes 500 and 600 enter the sleep mode (S519 and 521). Here, the coordinator 400 waits for RTS frames from other network nodes and then typically enters the sleep mode as well. Accordingly, the coordinator 400 may stay in the wakeup mode longer than the network nodes 500 and 600.

Upon start of the reservation confirmation period 230, the coordinator 400 and the network nodes 500 and 600 wake up from the sleep mode (S523, S525, and S527). During the reservation confirmation period 230, the coordinator 400 allocates timeslots to the respective network nodes 500 and 600 (S523) and transmits the GTS frames carrying the information on the timeslots to the network nodes 500 and 600 (S529). The network nodes 500 and 600 receive the GTS frames and acquire information regarding the reserved timeslots from the GTS frames.

If there are no uplink and downlink timeslots allocated to the network nodes 500 and 600, the coordinator 400 may enter the sleep mode after transmitting the GTS frames, and the network nodes 500 and 600 enters the sleep mode after receiving the GTS frames. The GTS frames carry the information about the uplink and downlink timeslots allocated to the network nodes associated with the coordinator 400.

In this exemplary embodiment, it is assumed that the target network node 500 is assigned uplink timeslots through the GTS frame. Accordingly, the coordinator 400 and the target network node 500 wake up during upon start of the uplink timeslots allocated to the target network node 500 during the contention free period 300 (S531 and S533), and the target network node 500 transmits a data frame through the uplink timeslots (S537). At this time, the neighbor network node 600 stays in the sleep mode before the arrival of the timeslots reserved for itself (S535).

Figure 6:
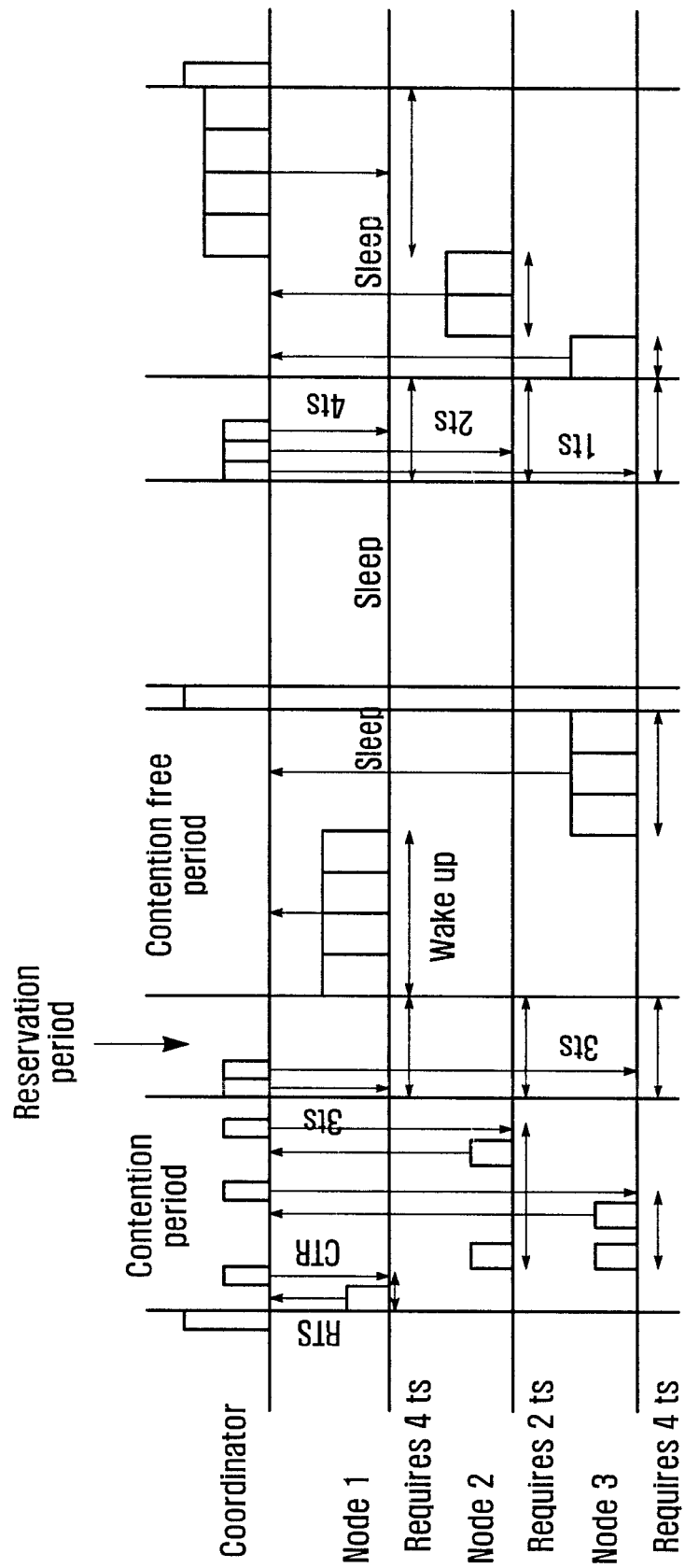
FIG. 6 is a diagram illustrating a superframe transmission procedure of a data communication method according to an exemplary embodiment of the present invention.

FIGS. 6 and 7 are diagrams illustrating exemplary superframe transmission procedures of a data communication method according to an exemplary embodiment of the present invention.

A coordinator transmits a beacon frame carrying information on a superframe in the beacon period, such that the coordinator and network nodes Node 1, Node 2, and Node 3 share the information about the superframe. The start time of the superframe is typically determined by the start of the beacon frame.

In this exemplary embodiment, the superframe transmission is described with a wireless network composed of a coordinator and three network nodes, i.e. Node 1, Node 2, and Node 3. In FIGS. 6 and 7, the Node 1, Node 2, and Node 3 wake up during the timeslots allocated to them so as to communicate data with the coordinator, respectively. Each network node maintains sleep mode during the timeslots allocated to other network nodes.

In this exemplary embodiment, it is assumed that the Node 1, Node 2, and Node 3 are allocated different timeslots such that each node wakes up at the start time of the timeslots allocated to it and transmits and/or receives data frames.

Referring to FIG. 6, the network nodes request timeslots and acquire registrations with the coordinator in an order of in an order of the Node 1, Node 3, and Node 2 during the contention period. Here, it is assumed that the Node 1, Node 2, and Node 3 have the same priority. The coordinator allocates timeslots to the Node 1, Node 3, and Node 2 in a First-In First-Out (FIFO) manner such that the network nodes communicate data with the coordinator in the order of Node 1, Node 3, and node 2 in the contention free period.

In FIG. 7, the network nodes request timeslots and are allocated the timeslots in an order of Node 1, Node 3, and Node 2. Although the Node 2 has requested the timeslots earlier than the Node 3, it fails receipt of the CTR such that the Node 3 acquires a higher priority and is allocated timeslots after the Node 3 has done. In this case, the Node 2 may occupy the timeslots prior to the time slots allocated to the Node 1 and Node 3 in the contention free period. That is, the coordinator can be configured to allocate timeslots in consideration of the priorities of the network nodes.

Each of the network nodes (e.g. Node 1, Node 2, and Node 3) wakes up from the sleep mode only during the timeslots allocated to each respective node, and stays in the sleep mode in most of the contention free period, thereby conserving power. Also, since the residual timeslots can be allocated to other network nodes, the resource utilization is improved.

Although exemplary embodiments of the present invention have been described in detail hereinabove, it should be clearly understood that many variations and/or modifications of the basic inventive concepts herein taught which may appear to those skilled in the present art will still fall within the spirit of the present invention and scope of the appended claims.

As described above, the MAC protocol and data communication method and system according to the present invention improves the channel utilization using a contention-based resource request frame transmission mechanism. Also, the MAC protocol and data communication method and system according to the present invention improves a Quality of Service (QoS) using a contention-based resource reservation technique. Also, the MAC protocol and data communication method and system according to the present invention improves the power efficiency of network nodes since each network node wakes up only for reserved time duration.

What is claimed is:

1. A data communication method for a wireless communication network including a coordinator and a plurality of network nodes, comprising:
    (a) broadcasting, from the coordinator, a beacon frame for informing the network nodes of a duration of a current superframe, the current superframe comprising a beacon period during which the network nodes receives the beacon frame broadcasted by the coordinator, a contention period after the beacon period, during which contention period, at least one network node reserves a channel by transmitting a channel request message to the coordinator and receiving a confirmation message from the coordinator, and a contention free period during which the at least one network node communicates with the coordinator through at least one reserved channel;
    (b) transmitting a Guaranteed Time Slot (GTS) frame from the coordinator to the at least one network node, allocating timeslots in accordance with the channel request message to the at least one network node for use within the current superframe, the GTS frame being transmitted during the contention period; and
    (c) transmitting a data frame from the coordinator to a corresponding target network node through the timeslots of the current superframe allocated to the at least one network node in (b).

2. The data communication method of claim 1, wherein the contention period comprises:
    a reservation request period during which the at least one network node transmits a Request To Send (RTS) frame to the coordinator and receives a Confirmation To Request (CTR) frame from the coordinator, the at least one network node recognizing a registration of channel request on the basis of the CTR frame; and
    a reservation confirmation period during which the coordinator transmits the GTS frame to the at least one network node, wherein the GTS frame notifies the at least one network node of allocated timeslots.

3. The data communication method of claim 2, wherein the at least one network node requests channel allocation for the contention free period by transmitting the RTS frame.

4. The data communication method of claim 3, wherein the RTS frame requested by the at least one network node comprises information regarding timeslots required for transmitting the data frame.

5. The data communication method of claim 2, wherein the coordinator allocates a plurality of timeslots required for the at least one network node to communicate the data frame with the coordinator using the GTS frame.

6. The data communication method of claim 5, wherein the GTS frame comprises information on an uplink timeslot and a downlink timeslot allocated to the at least one network node.

7. The data communication method of claim 1, wherein the target network node transmits an acknowledgement (ACK) frame to the coordinator in response to successful receipt of a data frame from the coordinator successfully.

8. The data communication method of claim 1, wherein the coordinator broadcasts the beacon frame during the beacon period of the superframe.

9. The data communication method of claim 1, wherein the coordinator transmits the GTS frame during a reservation confirmation period of the superframe.

10. The data communication method of claim 1, wherein the coordinator and the at least one network node communicate data frames in the contention free period of the superframe.

11. The data communication method of claim 1, wherein the coordinator and the at least one network node wakes up from a sleep mode during specific timeslots allocated to the at least one network node, and stays in the sleep mode during other timeslots.

12. A data communication method for a wireless communication network including a coordinator and a plurality of network nodes, comprising:
(a) broadcasting, from the coordinator, a beacon frame for informing the network nodes of a duration of a current superframe, the current superframe comprising a beacon period during which the network nodes receives the beacon frame broadcasted by the coordinator, a contention period after the beacon period, during which contention period at least one network node reserves a channel by transmitting a channel request message to the coordinator and receiving a confirmation message from the coordinator, and a contention free period during which the at least one network node communicates with the coordinator through the reserved channel;
(b) transmitting a Request To Send (RTS) frame to the coordinator for requesting an allocation of timeslots from the at least one network node that received the beacon frame in step (a);
(c) transmitting from the coordinator, a Confirmation To Request (CTR) frame in response to the RTS frame;
(d) transmitting, during the contention period, a Guaranteed Time Slot (GTS) frame from the coordinator to the at least one network node for informing of timeslots reserved for the at least one network node during the current superframe to communicate the data frame with the coordinator using the reserved timeslots; and
(e) transmitting a data frame from the at least one network node to the coordinator through the timeslots of the current superframe reserved in step (d) for the at least one network node.

13. The data communication method of claim 12, wherein the contention period comprises:
a reservation request period during which the at least one network node transmits the RTS frame to the coordinator and receives the CTR frame from the coordinator, the at least one network node recognizing a registration of channel request on the basis of the CTR frame; and
a reservation confirmation period during which the coordinator transmits the GTS frame to the at least one network node, wherein the GTS frame notifies the at least one network node of allocated timeslots.

14. The data communication method of claim 13, wherein the at least one network node requests channel allocation for the contention free period by transmitting the RTS frame.

15. The data communication method of claim 14, wherein the RTS frame comprises information regarding the timeslots required for transmitting the data frame.

16. The data communication method of claim 12, wherein the GTS frame comprises information on uplink and downlink timeslots allocated to the at least one network node.

17. The data communication method of claim 12, wherein the coordinator transmits an acknowledgement (ACK) frame to the at least one network node in response to receiving successfully a data frame from the at least one network node.

18. The data communication method of claim 12, wherein the coordinator broadcasts the beacon frame during the beacon period of the superframe.

19. The data communication method of claim 12, wherein the at least one network node transmits the RTS frame in a reservation request period of the superframe, and the coordinator transmits the CTR frame in the reservation request period of the superframe.

20. The data communication method of claim 12, wherein the coordinator transmits the GTS frame in a reservation confirmation period of the superframe.

21. The data communication method of claim 12, wherein the coordinator and the at least one network node communicate data frames in the contention free period of the superframe.

22. The data communication method of claim 12, wherein the coordinator and the at least one network node wakes up from a sleep mode during specific timeslots allocated to the at least one network node and stays in the sleep mode during other timeslots.

23. A data communication method for a wireless communication network including a coordinator and a plurality of network nodes, comprising:
(a) broadcasting, from the coordinator, a beacon frame for informing the network nodes of a duration of a current superframe, the current superframe comprising a beacon period during which the network nodes receive the beacon frame broadcasted by the coordinator, a contention period after the beacon period, during which contention period, at least one of the network nodes is permitted to request reservation of a channel by transmitting a channel request message to the coordinator containing information on timeslots required for transmitting data frames, and receives a confirmation message from the coordinator, and a contention free period during which the network nodes communicate with the coordinator through respective reserved channels;
(b) transmitting, during the contention period following transmission of the confirmation message, a Guaranteed Time Slot (GTS) frame from the coordinator to the network nodes for allocating timeslots in accordance with the channel request message to the at least one of the network nodes for use within the current superframe, the timeslots being allocated by the coordinator in consideration of priorities of the network nodes; and
(c) transmitting a data frame from the coordinator to a corresponding target network node through timeslots of the current superframe allocated thereto in (b);
wherein the network nodes each enter a sleep mode in between the beacon period and the contention free period.

* * * * *

UNITED STATES PATENT AND TRADEMARK OFFICE
CERTIFICATE OF CORRECTION

PATENT NO. : 8,644,213 B2
APPLICATION NO. : 12/343670
DATED : February 4, 2014
INVENTOR(S) : Deukhyoung Park It is certified that error appears in the above-identified patent and that said Letters Patent is hereby corrected as shown below:

In the Claims:

Column 10, Claim 1, Line 8 should read as follows:
--...network nodes receive the...--

Column 11, Claim 12, Line 12 should read as follows:
--...network nodes receive the...--

Signed and Sealed this
Sixth Day of May, 2014

Michelle K. Lee
*Deputy Director of the United States Patent and Trademark Office*